(12) United States Patent
Fujie et al.

(10) Patent No.: US 7,889,274 B2
(45) Date of Patent: Feb. 15, 2011

(54) IMAGE INPUT APPARATUS

(75) Inventors: Kenichi Fujie, Tokyo (JP); Yoshiyuki Fujii, Tokyo (JP); Hisashi Ishikura, Tokyo (JP); Tomoko Konda, Tokyo (JP); Takayuki Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1573 days.

(21) Appl. No.: 11/188,641

(22) Filed: Jul. 26, 2005

(65) Prior Publication Data

US 2006/0187314 A1    Aug. 24, 2006

(30) Foreign Application Priority Data

Feb. 23, 2005   (JP) .............................. 2005-047512

(51) Int. Cl.
*H04N 5/238* (2006.01)
*H04N 5/235* (2006.01)
*G03B 7/00* (2006.01)

(52) U.S. Cl. ........................................ 348/364; 348/362
(58) Field of Classification Search ........................ None
See application file for complete search history.

(56) References Cited

U.S. PATENT DOCUMENTS 6,947,087 B2 * 9/2005 Egawa et al. ................. 348/304
7,508,422 B2 * 3/2009 Kamon et al. ............ 348/229.1
2003/0103650 A1 * 6/2003 Otsuka et al. ............... 382/104

FOREIGN PATENT DOCUMENTS

| JP | 2836147 B2 | 10/1998 |
|---|---|---|
| JP | 2004-88312 A | 3/2004 |
| JP | 2006-020278 A | 1/2006 |

* cited by examiner

*Primary Examiner*—Sinh Tran
*Assistant Examiner*—Jason A Flohre
(74) *Attorney, Agent, or Firm*—Sughrue Mion, PLLC

(57) ABSTRACT

An image input apparatus can acquire an image with a high contrast without saturating a camera output even for a subject having a large light and dark difference while achieving a wide dynamic range. An image sensor has an input-output characteristic varying with a plurality of regions delimited according to a difference in the amount of incident light. A video luminance signal level is detected from a video signal of the image sensor. An amount of light on a screen is calculated from the image luminance signal level. The image sensor is adjusted to make the amount of light on the screen coincide with a target light amount. The target light amount is set such that a relation between the target light amount R and an amount of light Q at a change point that is at the lowest luminance in an input-output characteristic of the image sensor satisfies R<Q.

5 Claims, 20 Drawing Sheets

Wi : WEIGHT (i = 0~3)

Wi : WEIGHT (i = 0~2)

IMAGE INPUT APPARATUS

BACKGROUND OF THE INVENTION

1. Field of the Invention

The present invention relates to an image input apparatus for inputting image data to an image processing apparatus by using an image sensor having a wide dynamic range (e.g., 60 dB or more).

2. Description of the Related Art

In general, image sensing devices have a dynamic range with a linear input-output characteristic, so the dynamic range is limited, at maximum, to two digits (i.e., several tens dB) or so. Accordingly, there has been a problem that when the light and dark difference (dynamic range) of a subject is large (e.g., 60 dB or more), the output of an image input apparatus is saturated with respect to light in a high luminance region, so that a white blown-out (white degradation) or black block out (black degradation) phenomenon occurs, thus making it impossible to take a picture of an object that actually exists there.

In contrast to this, there has been proposed an image input apparatus which is able to take a picture of a subject even with a dynamic range of five digits or more without its output being saturated, by using an image sensing device with an output characteristic other than a linear characteristic (e.g., logarithmic compression) (see, for instance, a first patent document (Japanese patent application laid-open No. H3-192764)).

In addition, there also has been proposed an image sensing apparatus which is improved in contrast in a low luminance region by combining both of a linear characteristic and a logarithmic characteristic, and controlling a change point between the linear characteristic and the logarithmic characteristic in accordance with the brightness range of a subject to be sensed or imaged see, for instance, a second patent document (Japanese patent application laid-open No. 2004-88312)).

In the known image input apparatuses, however, there are the following problems. That is, for example, in case of the above-mentioned first patent document, it is difficult to provide an output stage with a dynamic range similar to that of the amount of incident light, and hence contrast is substantially reduced, thus making it hard to obtain a sufficient contrast as required for image processing such as character recognition, object detection, etc. Also, in case of the above-mentioned second patent document, a contrast as intended by an image sensing side or photographer cannot necessarily be obtained as in the case where a subject to be sensed is located in a high luminance region, for instance.

Moreover, controlling the characteristic of an image sensing device in accordance with the brightness range of a subject to be sensed, as in the image sensing device disclosed in the above-mentioned second patent document, is synonymous with changing the dynamic range of the image sensing device into a linear characteristic or a logarithmic characteristic so as to match the dynamic range of the subject. Accordingly, there arises the following problems. That is, when the dynamic range of the background is changed for instance, it is convenient in image processing to take a picture of the subject while keeping the contrast of the subject rather than moving the dynamic range of the image sensing device, but on the other hand, when the dynamic range of the image sensing device is changed in accordance with the brightness range of the subject, an image suitable for an image processing apparatus can not necessarily be obtained. In particular, for an image processing apparatus requiring recognition processing, reduced contrast of an object to be recognized directly means reduction in the recognition rate, and can be a main cause for impairing merchantability or marketability.

SUMMARY OF THE INVENTION

Accordingly, the present invention is intended to obviate the problems as referred to above, and has for its object to obtain an image input apparatus which is capable of acquiring an image of a high contrast without saturation of a camera output even for a subject having a large light and dark difference by using an image sensing device that has an input-output characteristic varying with light amount regions divided in accordance with the amount of incident light, and setting a target amount of light to a luminance region that is lower than the amount of light at a change point of the input-output characteristic of the image sensing device.

An image input apparatus according to the present invention includes: an image sensing device with an input-output characteristic varying with a plurality of regions delimited in accordance with a difference in the amount of incident light; an incident light amount level detection section that outputs a video luminance signal level of a video signal representative of a picture taken by the image sensing device; an on-screen light amount calculation section that calculates an amount of light on a screen of the video signal from the video luminance signal level; a target light amount value setting section that sets a target value R for the amount of light on the screen based on information on change points for the plurality of regions; and an exposure control section that adjusts an exposure time or output gain of the image sensing device so as to make the amount of light on the screen coincide with the target amount of light R. The target light amount value setting section sets the target amount of light R in such a manner that a relation between an amount of light Q at that one of the change points for the plurality of regions that is at the lowest luminance and the target amount of light R satisfies a requirement of R<Q.

According to the present invention, an image of a high contrast can be acquired without saturating a camera output even for a subject of a large light and dark difference.

The above and other objects, features and advantages of the present invention will become more readily apparent to those skilled in the art from the following detailed description of preferred embodiments of the present invention taken in conjunction with the accompanying drawings.

DESCRIPTION OF PREFERRED EMBODIMENTS

Now, preferred embodiments of the present invention will be described below in detail while referring to the accompanying drawings. Here, note that the same symbols denote the same or corresponding parts in respective figures.

Embodiment 1

Figure 1:
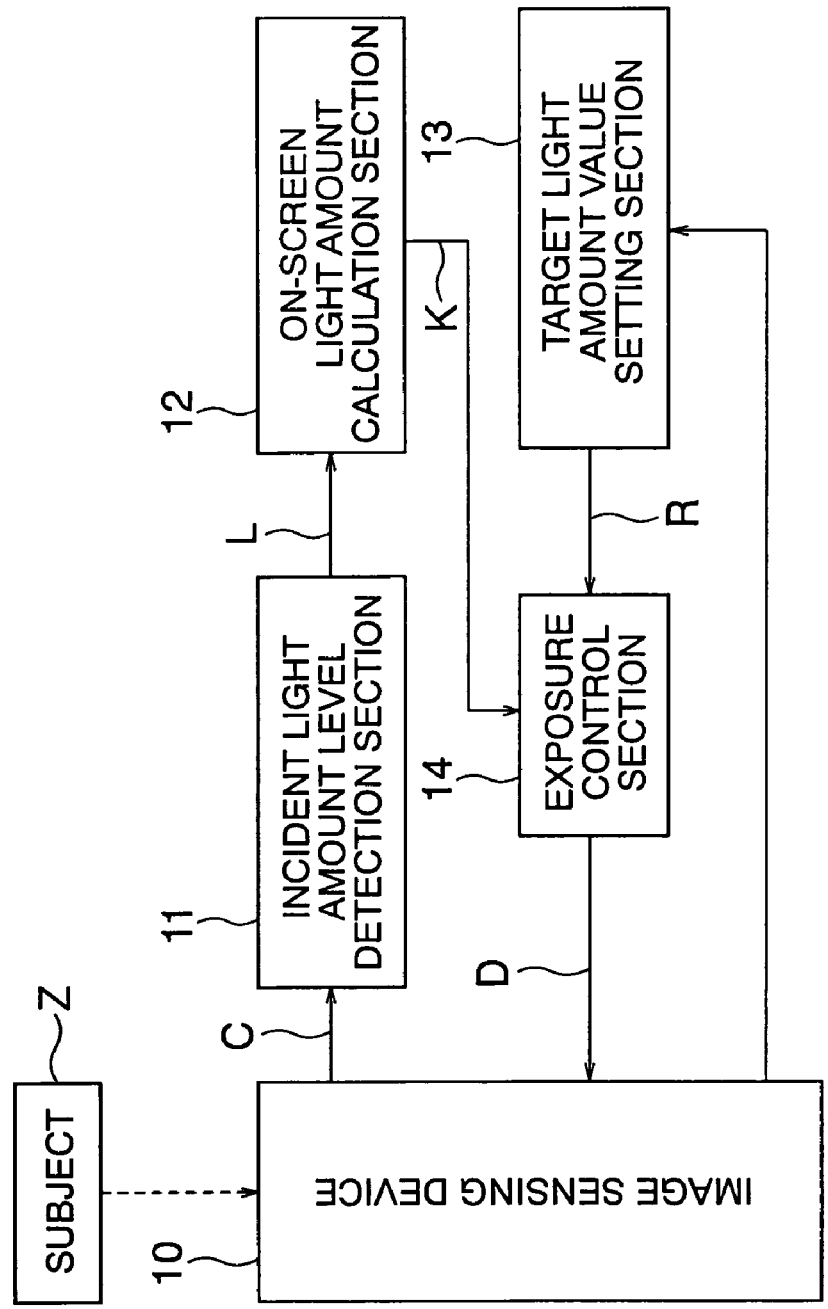
FIG. 1 is a block diagram showing the construction of an image input apparatus according to a first embodiment of the present invention.

First of all, a first embodiment of the present invention will be described below in detail. FIG. 1 is a block diagram that shows an image input apparatus according to the first embodiment of the present invention. In FIG. 1, the image input apparatus includes an image sensing device 10, an incident light amount level detection section 11, an on-screen light amount calculation section 12, a target light amount value setting section 13, and an exposure control section 14.

The image sensing device 10 has an input-output characteristic varying in each of a plurality of regions divided or delimited in accordance with the difference in the amount of incident light, and outputs a video signal C by taking a picture of a subject Z. Though not shown in FIG. 1, the video signal C is also output as an input signal to external equipment. The incident light amount level detection section 11 outputs a video luminance signal level L of the video signal C, and the on-screen light amount calculation section 12 calculates the amount of light K on the screen of the video signal from the video luminance signal level L.

The target light amount value setting section 13 sets a target value of the amount of light K on the screen as a target amount of light R based on light amount information on the change point of each region obtained from the image sensing device 10. The exposure control section 14 outputs an exposure control signal D to the image sensing device 10, so that the exposure time or the output gain of the image sensing device 10 can be adjusted so as to make the amount of light K on the screen coincide with the target amount of light R. The target amount of light R set by the target light amount value setting section 13 is set in such a manner that the relation between an amount of light Q at that one of change points for the plurality of regions which is at the lowest light level or luminance and the target amount of light R satisfies a requirement of "R<Q".

Figure 3:
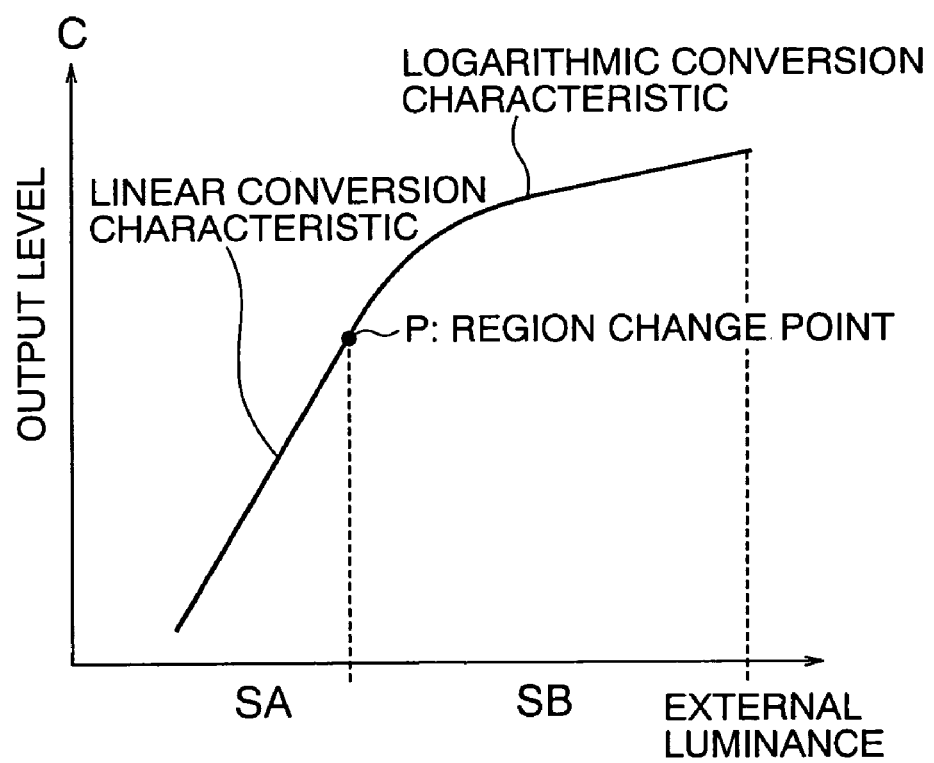
FIG. 3 is an explanatory view illustrating one example of the input-output characteristic of an image sensing device according to the first embodiment of the present invention.
Figure 4:
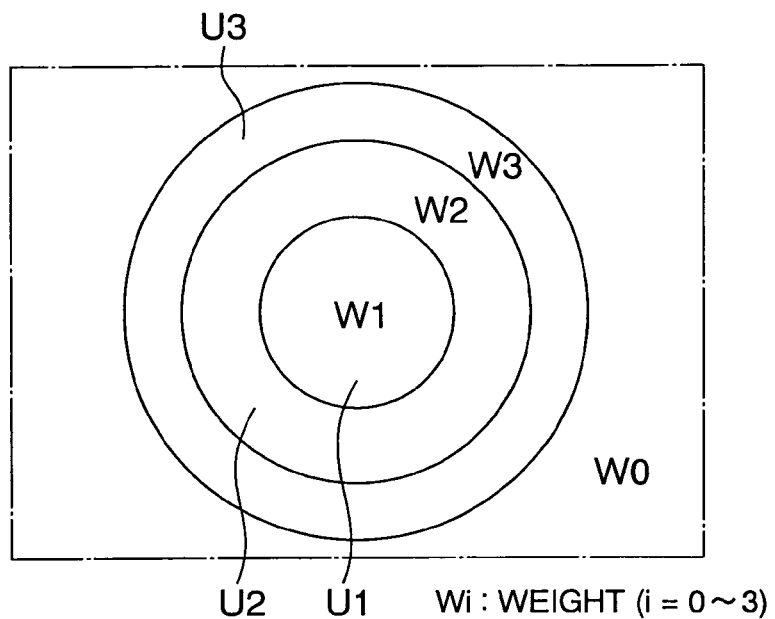
FIG. 4 is an explanatory view illustrating an example of the setting of light amount detection regions according to the first embodiment of the present invention.
Figure 5:
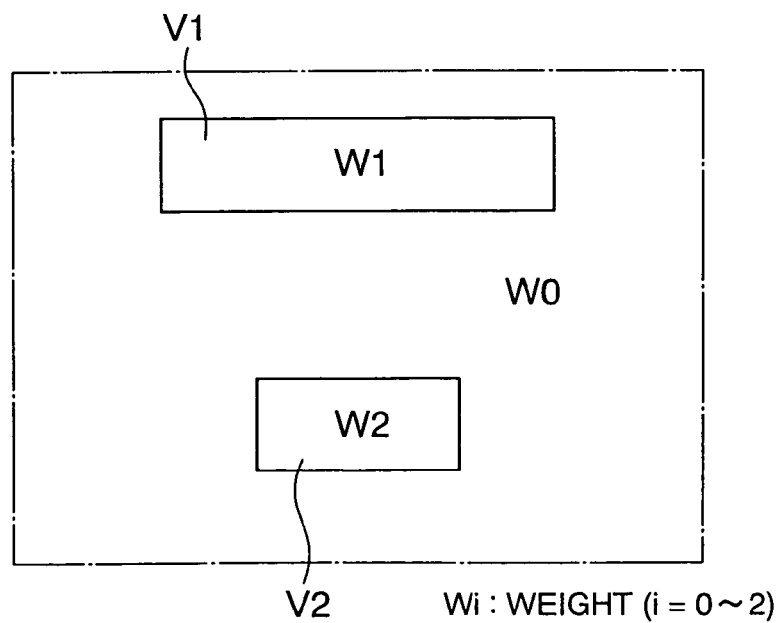
FIG. 5 is an explanatory view illustrating another example of the setting of light amount detection regions according to the first embodiment of the present invention.

Now, reference will be made to a procedure according to the first embodiment of the present invention as illustrated in FIG. 1 while referring to FIGS. 3 through 5 together with a flow chart of FIG. 2. FIG. 3 is an explanatory view that illustrates one example of the input-output characteristic of the image sensing device 10, and in FIG. 3, the axis of abscissa represents the actual external luminance, and the axis of ordinate represents the output level of the video signal C after the photoelectric conversion thereof by the image sensing device 10. FIG. 4 is an explanatory view that illustrates an example of the settings of light amount detection regions U1 through U3. FIG. 5 is an explanatory view that illustrates an example of the settings of light amount detection regions V1, V2. In FIG. 4 and FIG. 5, Wi (i=0, 1, 2, ... ) represent the coefficients of weight for the background and the light amount detection regions U1 through U3, V1, V2, respectively.

Figure 2:
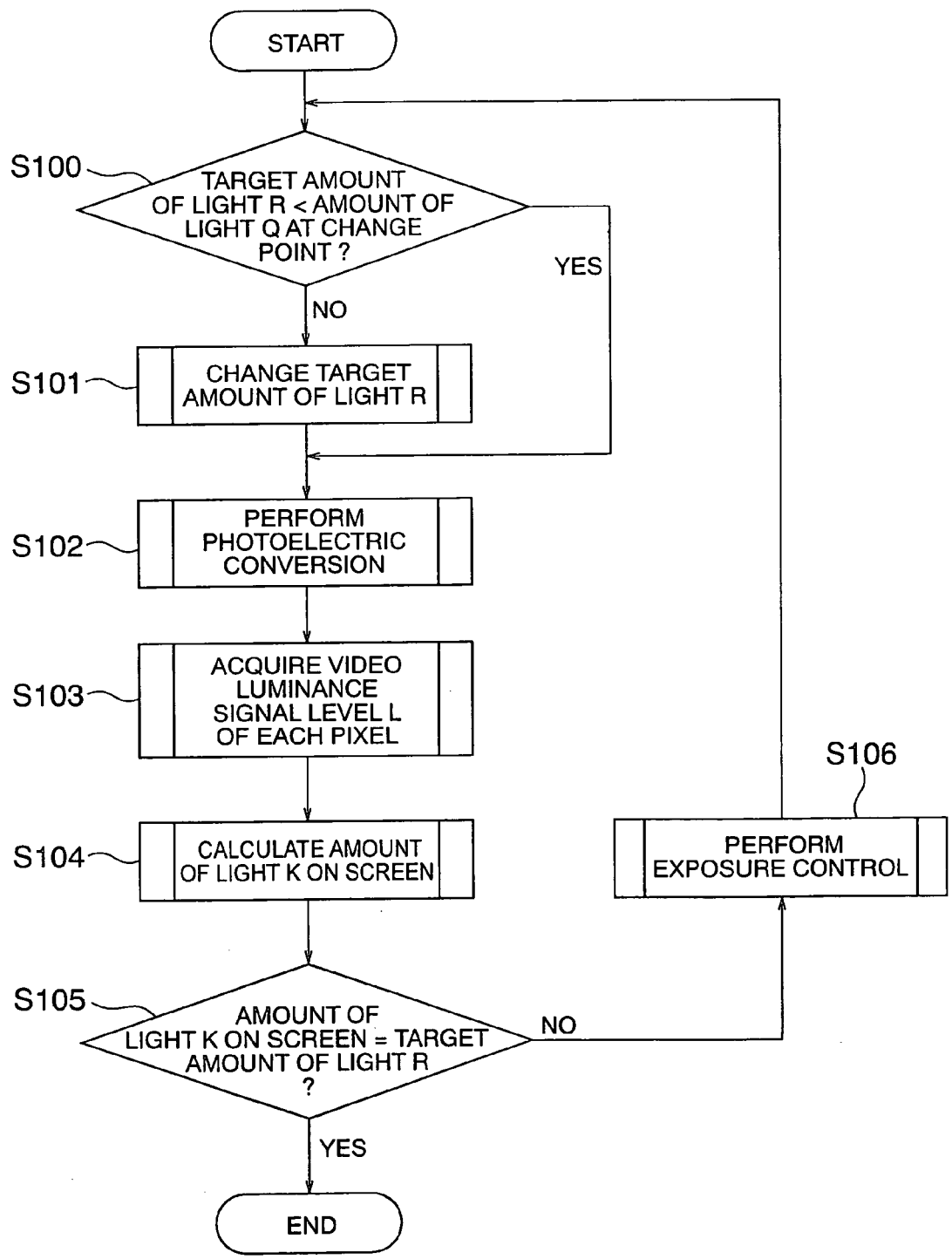
FIG. 2 is a flow chart illustrating the operation of the first embodiment of the present invention.

In FIG. 2, first of all, by making a comparison between the target amount of light R and the amount of light Q at a change point, it is determined whether the requirement of "R<Q" is satisfied (step S100). If determined as R<Q in step S100 (that is, YES), the control flow directly proceeds to the photoelectric conversion processing (step S102) of FIG. 2, whereas if determined as R≧Q (that is, NO), the setting of the target amount of light R is changed so as to satisfy the above-mentioned requirement (R<Q) (step S101), and the control flow then advances to photoelectric conversion processing (step S102).

In step S102, the light incident from an external environment including the subject Z is photoelectrically converted by the image sensing device 10 to be output as the video signal C. At this time, the incident light is converted into the video signal C by the input-output characteristic of the image sensing device 10, as shown in FIG. 3, for instance.

That is, if the light incident from the outside lies in a luminance region SA lower than the light level or luminance at a change point P, the image sensing device 10 outputs the video signal C by linearly converting the incident light while applying a linear transformation characteristic thereto so as to obtain a sufficient contrast. In addition, if the luminance of light lies in a region SB higher in luminance than the change point P, the image sensing device 10 logarithmically compresses the incident light to output the video signal C by applying a logarithmic conversion characteristic so as to avoid a white blown out phenomenon.

Subsequently, the video signal C output from the image sensing device 10 is converted into the corresponding video luminance signal level L in the incident light amount level detection section 11 (step S103). As a specific processing method of obtaining the video luminance signal level L, there is considered a method of converting the video signal C into the video luminance signal level L of 8 bits (256 levels of gray) by using, for instance, an A/D converter as the incident light amount level detection section 11.

Then, the amount of light K on the screen is calculated in the on-screen light amount calculation section 12 based on the video luminance signal level L of each pixel output from the incident light amount level detection section 11 (step S104). At this time, a method of obtaining the average of the video luminance signal level L for each pixel, for instance, is considered as a specific calculation method for obtaining the amount of light K on the screen. Additionally, there can also be considered a method of obtaining a weighted average with a weight Wi for at least one or more region, etc., as shown in FIG. 4 and FIG. 5.

When the position of the subject Z on the imaging or picture-taking screen is known beforehand in FIG. 4, three regions U1 through U3 besides the background, for example, are set as concentric circular regions with the location of the subject Z being placed as their center to detect the amount of light K on the screen, so that the weighted average is thereby calculated by the use of weights Wi (i=0 through 3) varying with the regions, respectively. Also, when the subject Z is recognized in a plurality of positions on the imaging or picture-taking screen in FIG. 5, two regions V1, V2 besides the background, for instance, are set so that a weighted average is calculated by using different weights Wi (i=0-2) for the respective regions.

Thereafter, by making a comparison between the amount of light K on the screen obtained in step S104 and the target amount of light R set by the target light amount value setting section, it is determined whether both of them coincide with each other (step S105), and if determined as K=R (that is, YES), the processing routine of FIG. 2 is terminated at once. On the other hand, if determined as K≠R in step S105 (that is, NO), the exposure control of the image sensing device 10 is changed by the exposure control section 14 (the exposure time or output gain is adjusted) (step S106). Hereinafter, a return is carried out to step S100 where the above-mentioned processing is repeated until it is determined as "K=R" in step S105.

Figure 6:
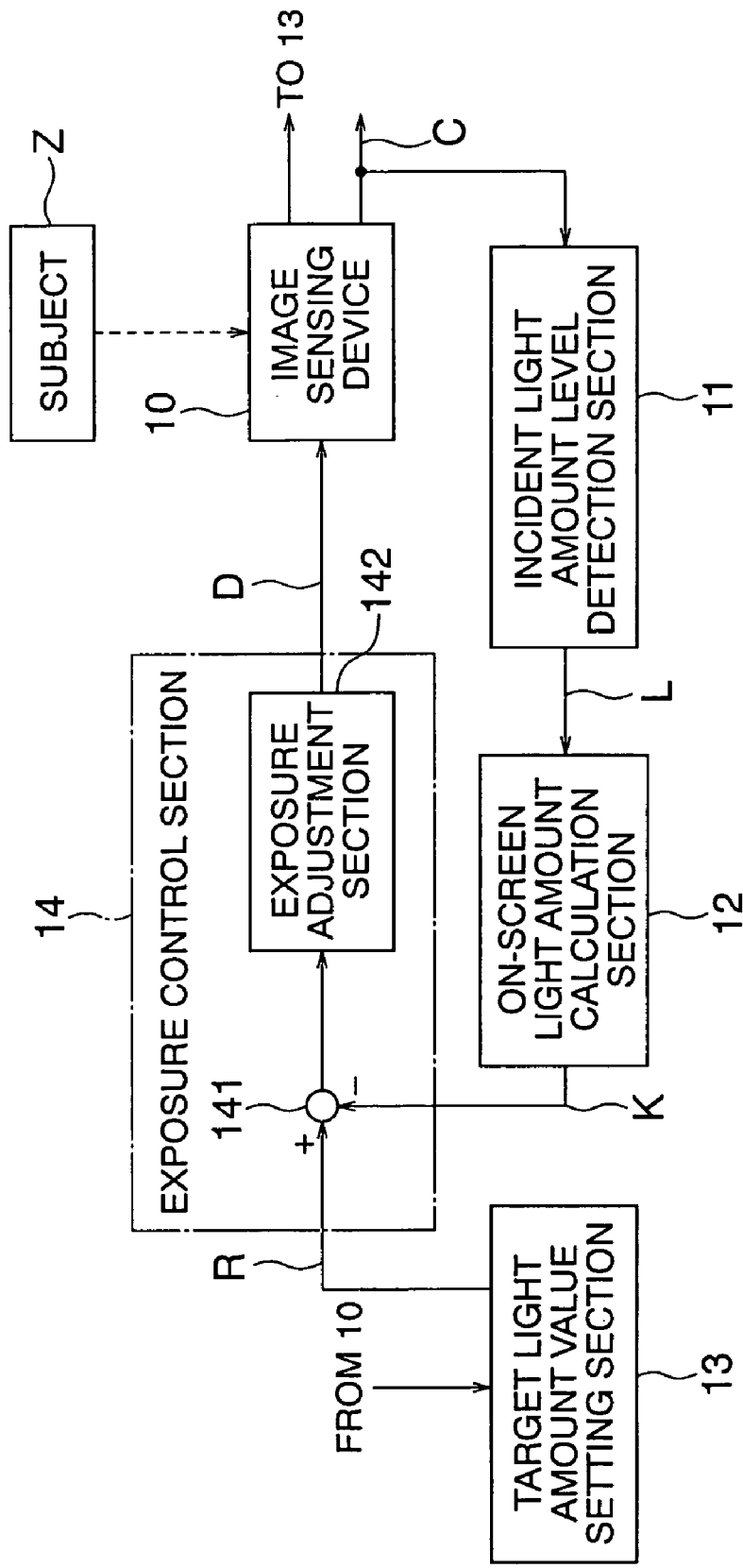
FIG. 6 is a block diagram illustrating an example of the concrete configuration of an exposure control system of the image sensing device according to the first embodiment of the present invention.

The target amount of light R is a control target value for an exposure control system of the image sensing device 10, and can be set to a value of "10 [LSB]" in the form of an 8-bit A/D value. FIG. 6 is a block diagram that illustrates a concrete or specific construction of the exposure control section 14, and in FIG. 6, the exposure control section 14 comprises a subtractor 141 and an exposure adjustment section 142.

In the exposure control section 14, the subtractor 141 calculates a difference between the target amount of light R and the amount of light K on the screen, and the exposure adjustment section 142 generates an exposure control signal D to the image sensing device 10 so as to counterbalance or eliminate the difference between the target amount of light R and the amount of light K on the screen. As a result, the amount of light K on the screen due to the image sensing device 10 is controlled in a feedback manner so as to coincide with the target amount of light R, and the final video signal C representing a picture taken at this time is output to the outside.

Thus, the image input apparatus according to this first embodiment includes the image sensing device 10 with an input-output characteristic varying in accordance with the amount of incident light, the incident light amount level detection section 11 that detects the video luminance signal level L of the video signal C from the image sensing device 10, the on-screen light amount calculation section 12 that calculates the amount of light K on the screen from the video luminance signal level L, the target light amount value setting section 13 that sets the target amount of light R on the basis of information on change points P for the plurality of regions, and an exposure control section 14 that adjusts the image sensing device 10 so as to make the amount of light K on the screen coincide with the target amount of light R. The target light amount value setting section 13 sets the target amount of light R in such a manner that the relation between the amount of light Q at that one of change points for the plurality of regions which is at the lowest light level or luminance and the target amount of light R satisfies the requirement of "R<Q".

The target amount of light R is beforehand set in such a manner that the relation between the amount of light Q at that change point, among at least one or more regional change points P (see FIG. 3), which is at the lowest light level or luminance and the target amount of light R satisfies the requirement "R<Q". The exposure control section 14 comprises, for example, an AGC circuit, an electronic iris control circuit or the like, and in step S105 in FIG. 2, it serves to adjust exposure so as to make the amount of light K on the screen equal to the target amount of light R (that is, YES).

Figure 7:
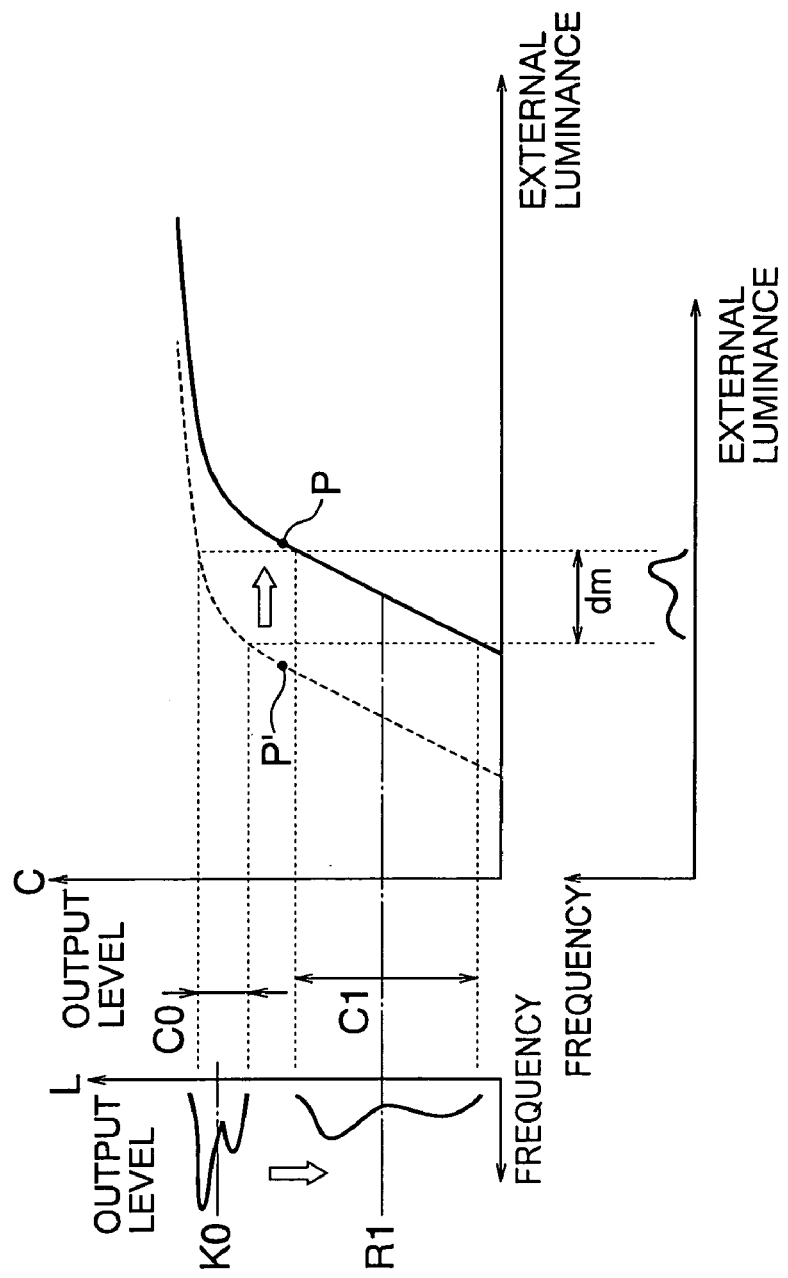
FIG. 7 is an explanatory view illustrating the input-output characteristic of the image sensing device corresponding to the amount of light on a screen and the respective target amounts of light according to the first embodiment of the present invention.

Next, the processing operation of the target light amount value setting section 13 (the step S101 in FIG. 2) based on information on the change point P will be specifically described while referring to FIG. 7. FIG. 7 is an explanatory view that illustrates the characteristic of the output level of the video signal C with respect to an external luminance when actually taking a picture of the subject Z.

In FIG. 7, the subject Z exists in the range of a light and dark difference dm, and a broken line represents one example of the output characteristic before the processing routine of FIG. 2 is executed, and a solid line represents the output characteristic after the processing routine of FIG. 2 is executed, that is, the output characteristic when a target amount of light R1 is set with respect to the subject Z.

In FIG. 7, when the processing routine of FIG. 2 is executed, the target amount of light R1 is first set such that the relation between the target amount of light R1 and an amount of light Q0 at a change point P' is set to be R1<Q0. Then, in case where the output characteristic of the image sensing device 10 before the processing routine of FIG. 2 is executed is represented, for instance, by the broken line in FIG. 7, the output level width of the acquired image of the subject Z becomes a contrast C0 by application of the logarithmic conversion characteristic (step S102 in FIG. 2). Subsequently, the video signal of the contrast C0 is converted into a corresponding image luminance signal level L0 in the incident light amount level detection section 11 (step S103). In addition, when an average of the video luminance signal level L0 of each pixel is obtained to provide the amount of light on the screen, the amount of light on the screen is represented by K0 in FIG. 7 (step S104).

Hereinafter, in step S105, it is determined that the amount of light K0 on the screen and the target amount of light R1 in FIG. 7 do not coincide with each other, so the output characteristic of the image sensing device 10 is adjusted by exposure control processing (step S106) in such a manner as shown by the solid line in FIG. 7, whereby the output level width or range of the acquired image of the subject Z becomes a contrast C1 by application of the linear conversion characteristic. As a result, it can be said that the contrast of the acquired image is improved after the execution of the processing routine of FIG. 2.

That is, when the amount of light K on the screen is located at a higher luminance side than the amount of light Q at the change point (i.e., in the state of $K \geq Q$), there arises a problem that the logarithmic conversion characteristic is applied to lower the contrast, whereas by setting the target amount of light R, which is the target value of the amount of light on the screen, at a lower luminance side than the amount of light Q at the change point (i.e., R<Q), the amount of light K on the screen will be located at a lower luminance side than the amount of light Q at the change point (i.e., K<Q), too, as in the case of the target amount of light R, so the linear conversion characteristic is applied, thus improving the contrast. Although in the above example, the average of the video luminance signal level L0 of each pixel is used as the amount of light on the screen, the same effects as stated above can be obtained even if a peak value (i.e., a maximum value or a minimum value) of the output level width of the acquired image for the subject Z is used as the amount of light on the screen.

According to the first embodiment of the present invention, the image sensing device 10 applies the linear conversion characteristic with respect to the lower luminance side region SA, but the logarithmic conversion characteristic with respect to the higher luminance side region SB, as shown in FIG. 3. In addition, the target light amount value setting section 13 sets the target amount of light R in such a manner that the relation between the amount of light Q at that one of change points for the plurality of regions of the input-output characteristic of the image sensing device 10 which is at the lowest luminance and the target amount of light R satisfies the requirement of "R<Q". As a result, the low luminance region of the subject Z represented by the target amount of light R can be linearly converted, so that a picture can be taken with a high contrast while maintaining a wide dynamic range characteristic.

Accordingly, even in case of the subject Z having a large light and dark difference, it is possible to acquire an image of a high contrast without saturating the camera output. Moreover, it is possible to acquire an image with a contrast suitable for image processing without changing the dynamic range of the linear characteristic or logarithmic characteristic of the image sensing device 10. In particular, for an image processing apparatus having recognition ability, it is possible to maintain the contrast of the subject Z to be recognized even if the dynamic range of the background changes, as a consequence of which there can be obtained an image effective for image processing.

Embodiment 2

Although in the above-mentioned first embodiment, an image with a high contrast is acquired by changing the setting of the target amount of light R so as to satisfy the above-mentioned condition or requirement (the target amount of light R<the amount of light Q at the change point), there may be cases where the target amount of light can not be set so as to satisfy the above-mentioned requirement depending upon a luminance range of the subject Z even if this method is applied.

Figure 8:
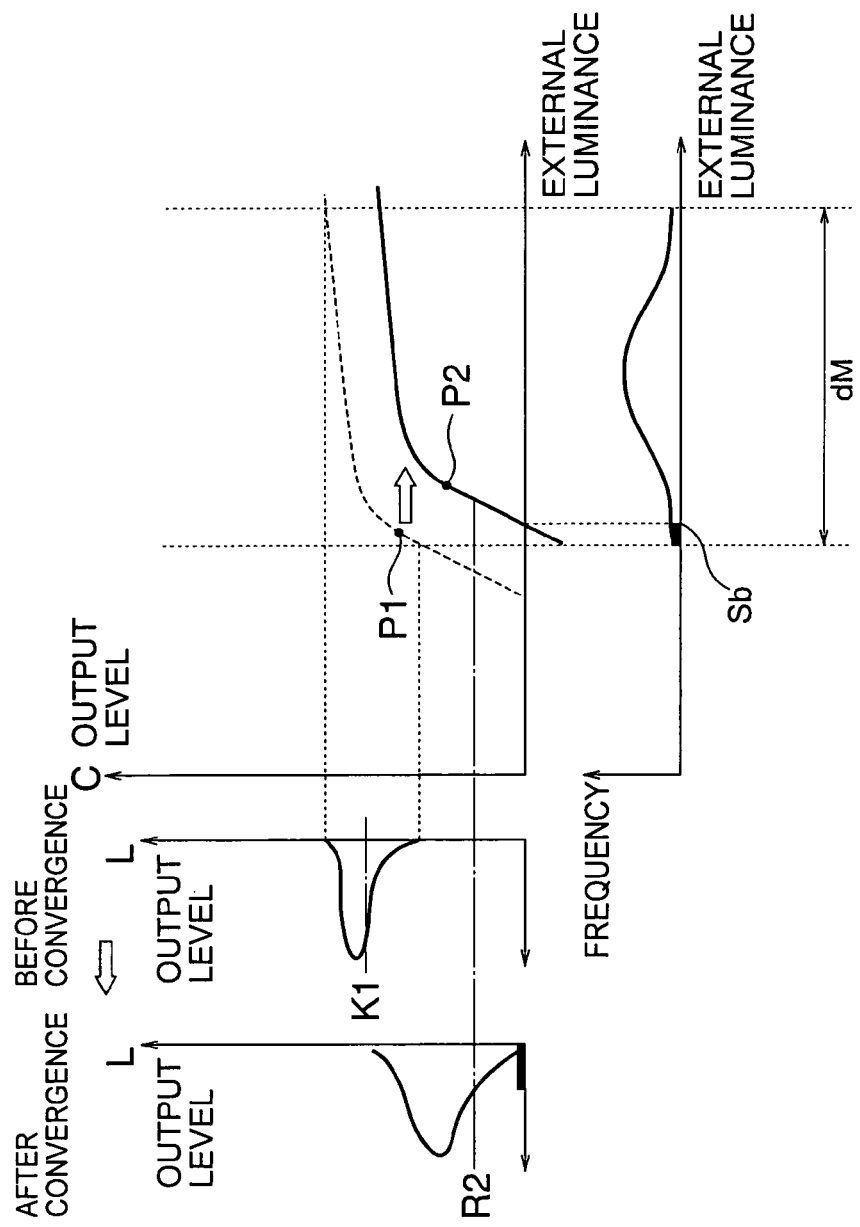
FIG. 8 is an explanatory view illustrating the input-output characteristic of the image sensing device and the brightness histogram of a subject according to the first embodiment of the present invention in a situation where the target amount of light can not be set to a luminance region lower than that at a change point of the regions.

For example, when the processing routine of FIG. 2 is executed in case of taking a picture of the subject Z having a light and dark difference dM of 60 dB or more for instance, a target amount of light R2 is set so as to satisfy the above-mentioned requirement (R<Q) in consideration of a change point P1 of an output characteristic represented by a broken line (before execution of the processing routine of FIG. 2). In addition, the amount of light K1 on the screen acquired by using an output characteristic represented by a broken line in FIG. 8 converges to the target amount of light R2 under the exposure control processing of FIG. 2, and at the same time, the output characteristic of the image sensing device 10 shifts to the solid line in FIG. 8. This results in a state where a low luminance region Sb of the subject Z does not appear in the output level in FIG. 8 ("black block out or black degradation").

Figure 9:
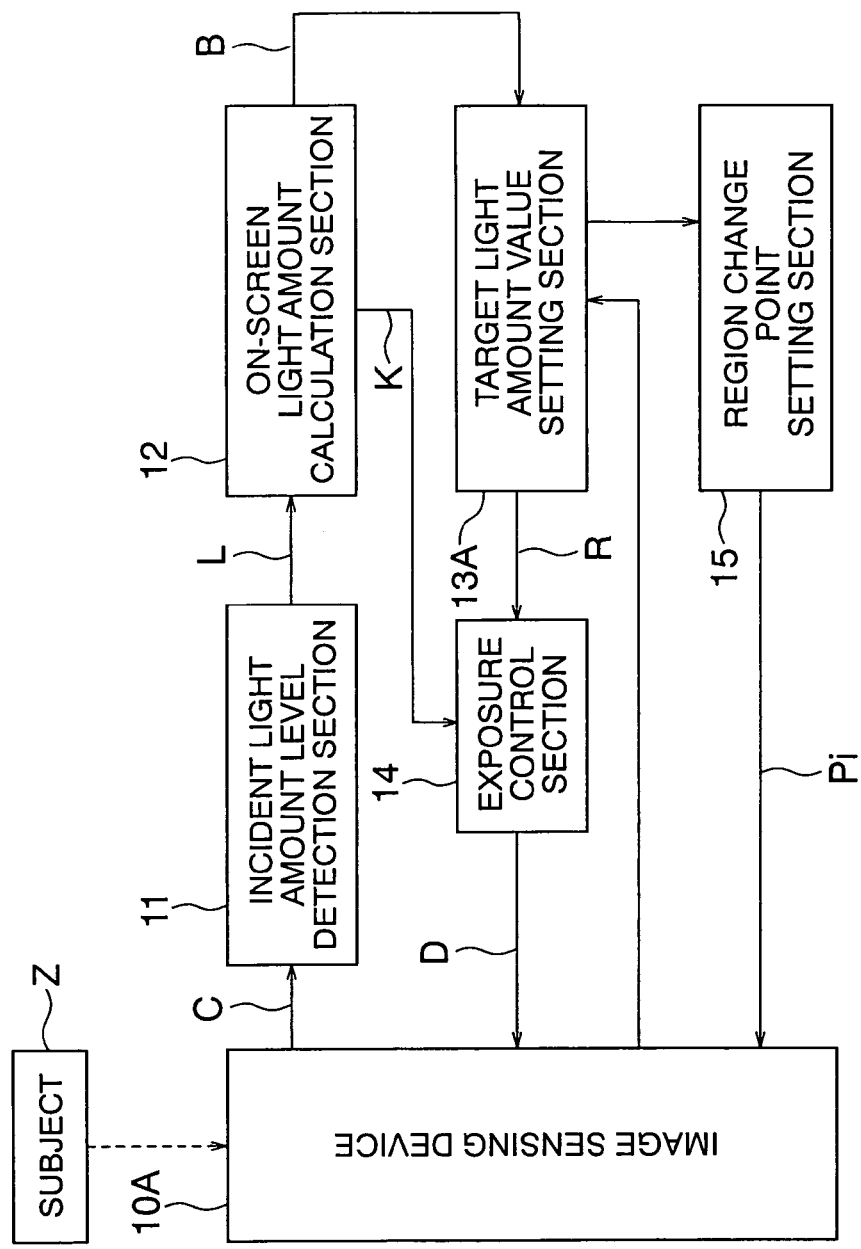
FIG. 9 is a block diagram showing the construction of an image input apparatus according to a second embodiment of the present invention.

In this case, it is desirable to set the change point P so as to satisfy the above-mentioned requirement when the relation between the target amount of light R and the amount of light Q at the change point does not satisfy the above-mentioned requirement after the exposure of the image sensing device 10 has been adjusted so as to make the amount of light K on the screen coincide with the target amount of light R. FIG. 9 is a block diagram that illustrates an image input apparatus according to a second embodiment of the present invention in which the change point P is set to satisfy the above-mentioned requirement.

In FIG. 9, the same parts or components as those described above (see FIG. 1) are identified by the same symbols or by the same symbols with "A" affixed to their ends, while omitting a detailed explanation thereof. In this case, in association with an image sensing device 10A and a target light amount value setting section 13A, provision is made for a region change point setting section 15 that serves to set a plurality of change points Pi for a plurality of regions. The region change point setting section 15 comprises, for example, a break point voltage regulation circuit, and serves to change the setting of a change point Pi that is at the lowest light level or luminance so as to satisfy the above-mentioned requirement when the relation between the amount of light Q at the change point of the lowest luminance and the target amount of light R does not satisfy the above-mentioned requirement after the exposure of the image sensing device 10A has been adjusted by an exposure control section 14.

In this case, black block out information B, indicating whether the output level of an acquired image for the subject has caused "black block out or black degradation", is sent from an on-screen light amount calculation section 12 to the target light amount value setting section 13A. Here, it is assumed that a determination as to whether the "black block out" has occurred is made in the on-screen light amount calculation section 12, and as a specific determination method, there is considered a method of determining that a "black block out" phenomenon has occurred when the total number α of pixels whose video luminance signal level L is "0" exceeds a predetermined value αr (e.g., 1% of the light amount detection regions).

Figure 10:
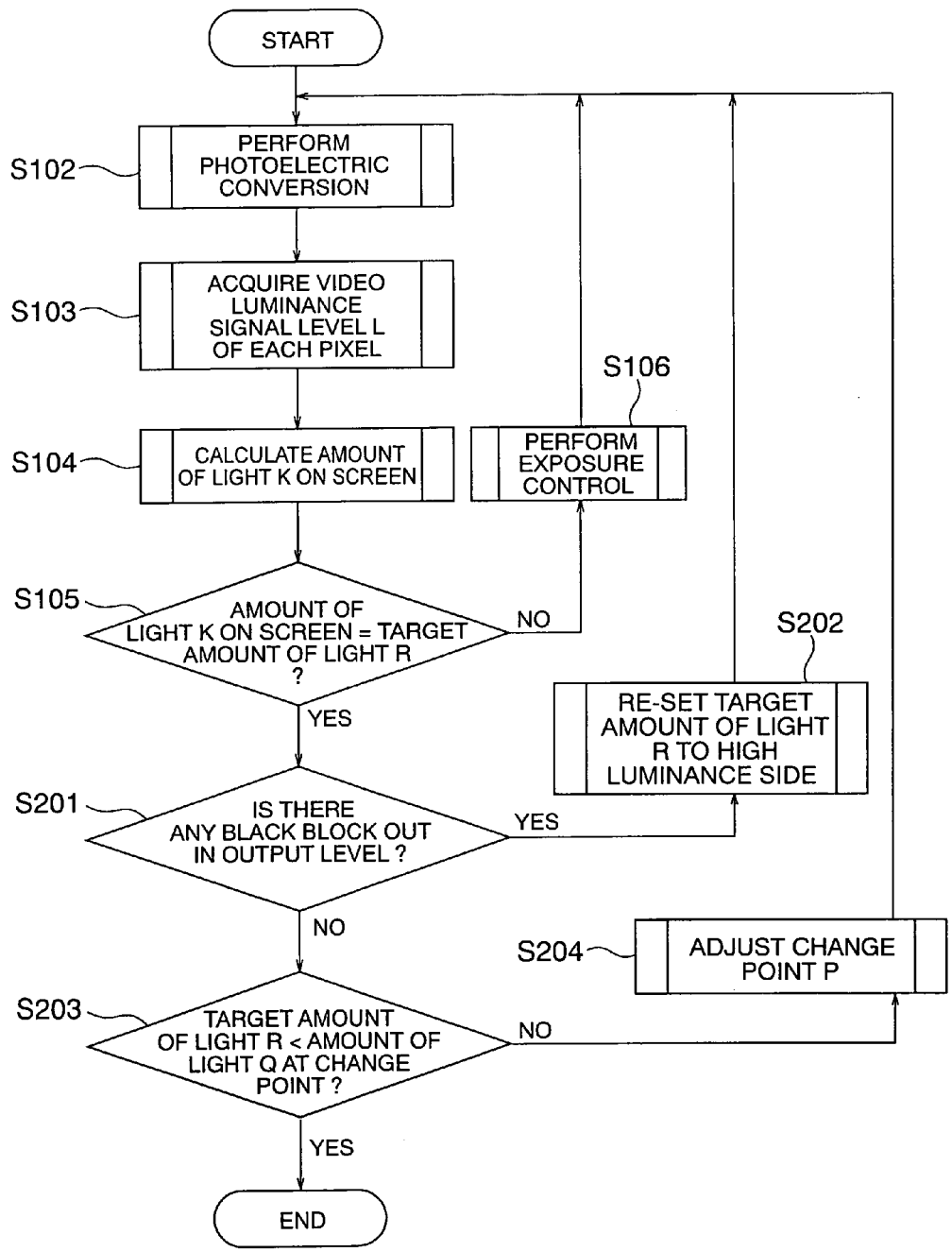
FIG. 10 is a flow chart illustrating the operation of the image input apparatus according to the second embodiment of the present invention.

Now, reference will be made to a specific procedure according to the second embodiment of the present invention as illustrated in FIG. 9 while referring to a flow chart of FIG. 10. In FIG. 10, the same or like processes (steps S102 through S106) as those described above (see FIG. 2) are identified by the same symbols while omitting a detailed description thereof. In addition, step 203 corresponds to the above-mentioned step S100 (FIG. 2).

First of all, if it is determined as K=R in step S105 (that is, YES), the on-screen light amount calculation section 12 subsequently calculates the amount of light K on the screen, and then determines whether the output level of the acquired image for the subject has caused "black block out" (step S201). That is, the on-screen light amount calculation section 12 outputs the black block out information B by making a determination as to the presence or absence of the "black block out", depending of whether the total number α of pixels whose video luminance signal level L is "0" exceeds the predetermined value a r. If the total number α of pixels whose video luminance signal level L becomes "0" exceeds the predetermined value a r, and a determination is made in step S201 that the "black block out" has occurred (that is, YES), the control flow proceeds to target light amount value resetting processing (step S202), whereas if otherwise, i.e., it is determined that no "black block out" has occurred (that is, NO), the control flow proceeds to the following determination processing (step S203).

In the target light amount value resetting processing (step S202), the target light amount value setting section 13A re-sets the target amount of light to a high luminance side so as to avoid the "black block out" based on the black block out information B, and then a return is carried out to the photoelectric conversion processing (step S102) in FIG. 10. Thereafter, when it comes to a state where no "black block out" has occurred after the execution of the exposure control processing (step S106), it is determined in step S201 that there exist no "black block out", and the control process proceeds to step S203.

In step S203, the target light amount value setting section 13A makes a comparison between the target amount of light R and the amount of light Q at the change point, and it is determined whether the target amount of light R is lower than the amount of light Q at the change point. When it is determined as R<Q (that is, YES), the processing routine of FIG. 10 is terminated at once, whereas if determined as R≧Q in step S203 (that is, NO), the setting is changed to a new change point P that satisfies the above-mentioned requirement (step S204), and a return is performed to the photoelectric conversion processing (step S102) in FIG. 10. Hereinafter, the above-mentioned processing is repeated until it is determined as "R<Q" in step S203.

Figure 11:
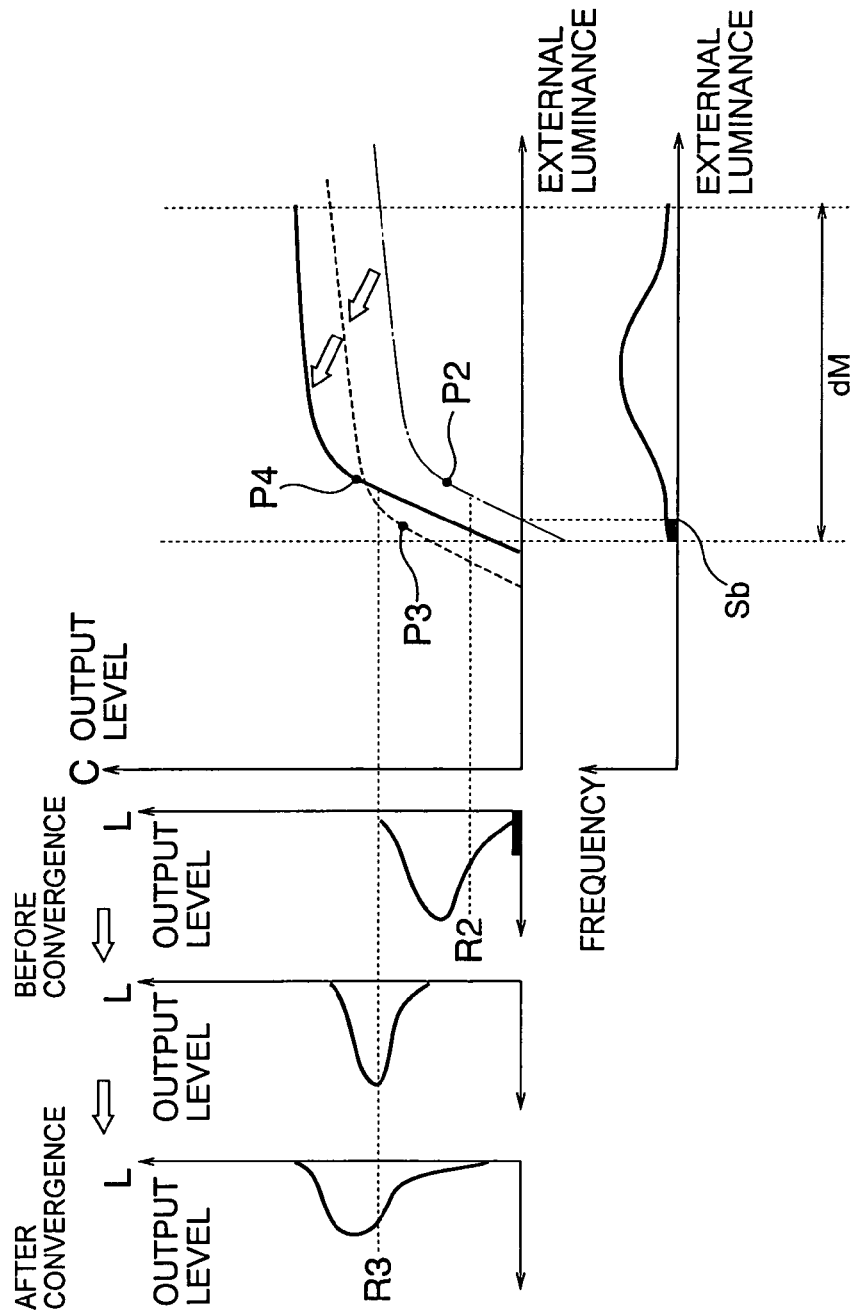
FIG. 11 is an explanatory view illustrating the change of the input-output characteristic of an image sensing device and a brightness histograms of a subject in accordance with the movement of a change point according to the second embodiment of the present invention.

Next, reference will be made in further detail to the processing operation of the region change point setting section 15 (around the step S204 in FIG. 10) based on information from the target light amount value setting section 13A while referring to FIG. 11. FIG. 11 is an explanatory view that illustrates the characteristic of the output level of the video signal C with respect to an external luminance when actually taking a picture of the subject Z, wherein the respective output levels in the states before and after the convergence of the input-output characteristic are shown. In FIG. 11, the subject Z exists in the range of a relatively wide light and dark difference dm, and in this case, the subject Z has the low luminance region Sb.

For instance, let us assume that in the input-output characteristic of the image sensing device 10 after the exposure adjustment of the exposure control section 14, the total number α of the pixels for which the output level of the acquired image of the subject becomes "0" exceeds the predetermined value αr, as shown by an alternate long and short dash line in FIG. 11, and hence it is determined that the "black block out" has occurred. At this time, the target amount of light R2 is set to be changed to a new target amount of light R3 so as to avoid the "black block out", whereby the exposure adjustment of the exposure control section 14 is carried out again. As a result, the input-output characteristic of the image sensing device 10 converges, as indicated by a broken line in FIG. 11. Thereafter, in the processing routine of FIG. 10, the control flow proceeds from step S201 to step S203 since there occurs no "black block out" in the input-output characteristic of the image sensing device 10 (see the broken line in FIG. 11).

In step S203, a comparison is made between an amount of light Q3 at a change point P3 in the input-output characteristic of the image sensing device 10 (see the broken line in FIG. 11) and a target amount of light R3. At this time, the relation between the amount of light Q3 at the change point P3 and the target amount of light R3 does not satisfy the above-mentioned requirement "R<Q", clearly seen from FIG. 11, so the control flow proceeds from step S203 to step S204.

In step S204, in consideration of the target amount of light R3, the region change point setting section 15 adjusts (changes the setting of) the amount of light Q3 at the region change point P3 to the high luminance side so as to satisfy the above-mentioned requirement "R<Q", and a return to the photoelectric conversion processing (step S102) is then carried out. Thereafter, the exposure adjustment of the exposure control section 14 is executed again, whereby the input-output characteristic of the image sensing device 10 converges, as indicated by the solid line in FIG. 11, thus resulting in a new change point P4.

Thereafter, in the processing routine of FIG. 10, the control flow proceeds from step S201 to step S203 since there occurs no "black block out" in the input-output characteristic of the image sensing device 10 (see the solid line in FIG. 11). In addition, at this time, the relation between the target amount of light R3 and an amount of light Q4 at the change point P4 satisfies the above-mentioned requirement "R<Q", as clear from FIG. 11, so the processing routine of FIG. 10 is terminated immediately from step S203.

According to the above processing, even when the light and dark difference dM (dynamic range) of the subject Z is wide, the linear characteristic is applied up to a high luminance side range, so an image with a high contrast can be obtained over a wide luminance range.

Thus, according to the second embodiment of the present invention, the change point P is set in such a manner that the relation between the amount of light Q at that one of change points for the plurality of regions of the input-output characteristic of the image sensing device 10 which is at the lowest luminance and the target amount of light R satisfies the requirement of "R<Q". As a result, the low luminance region of the subject Z represented by the target amount of light R can be linearly converted, so a picture can be taken with a high contrast while maintaining a wide dynamic range characteristic.

That is, when the relation between the target amount of light R and the amount of light Q at a change point does not satisfy the requirement "R<Q" irrespective of how to set the target amount of light R, it is possible to change the setting of the change point P so as to satisfy the requirement "R<Q". Accordingly, even in case of the subject Z having the large light and dark difference dM, it is possible to acquire an image of a high contrast without saturating the output level at the high luminance side of the video signal C. Moreover, even when the brightness range of the subject Z becomes narrower, exposure is adjusted in such a manner that the target amount of light R and the amount of light K on the screen satisfying the above-mentioned requirement is made to coincide with each other. Consequently, a picture can be taken with a high contrast while maintaining a wide dynamic range characteristic.

Embodiment 3

In the above-mentioned first and second embodiments, any concrete example of the subject Z is not described, for instance, the image sensing device 10 may be mounted on a vehicle such as an automobile, and a white line on a road on which the vehicle is traveling may be the subject to be imaged. Hereinafter, reference will be made to a vehicle mounted image input apparatus according to a third embodiment of the present invention, being applied to white line recognition processing.

Figure 12:
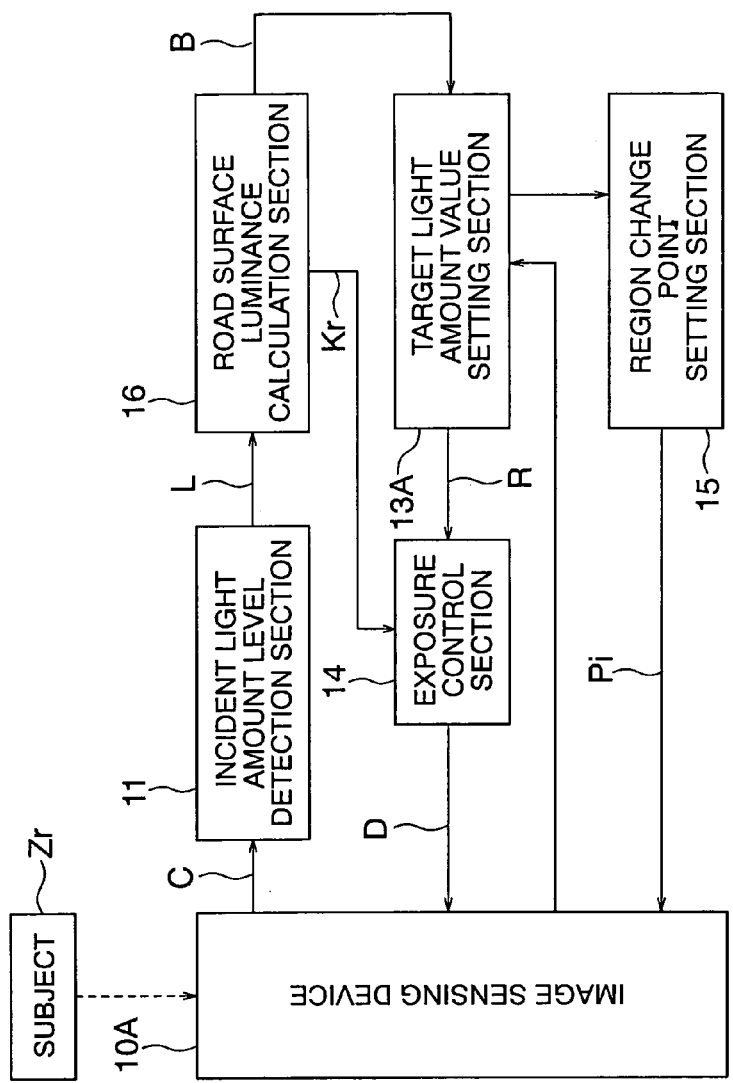
FIG. 12 is a block diagram showing the construction of an image input apparatus according to a third embodiment of the present invention.
Figure 13:
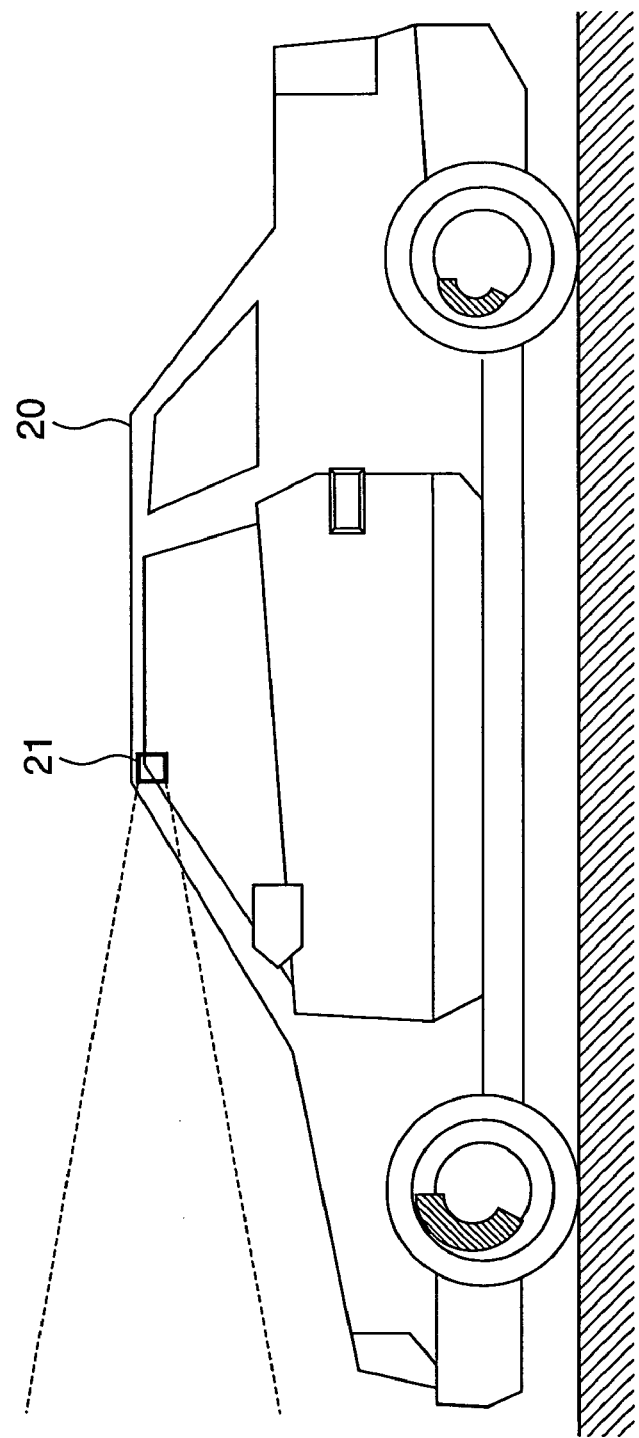
FIG. 13 is a side elevation showing an example in which the image input apparatus according to the third embodiment of the present invention is mounted on a vehicle.
Figure 14:
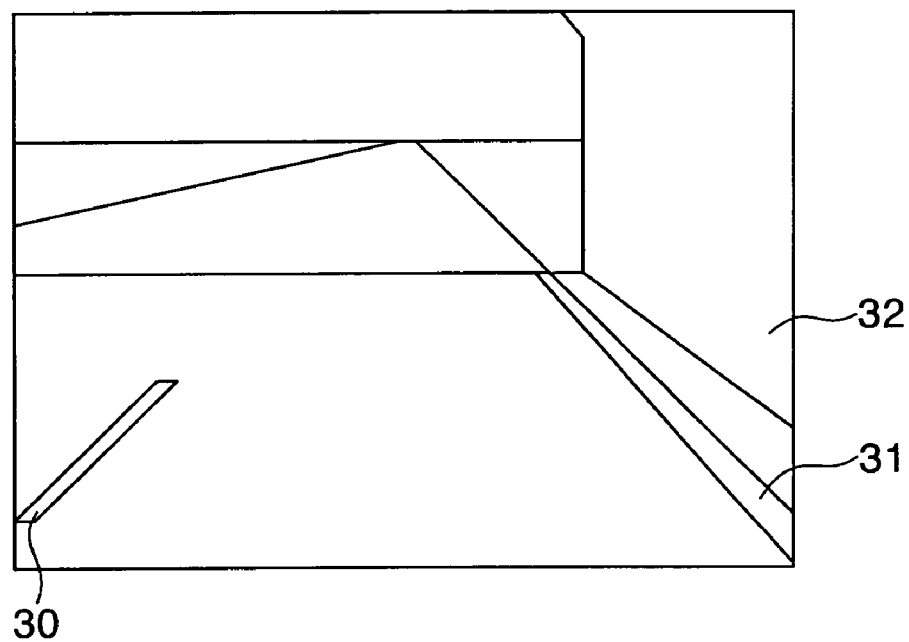
FIG. 14 is an explanatory view illustrating one example of a road condition image (tunnel exit) around the vehicle obtained from the image input apparatus of FIG. 13.

FIG. 12 is a block diagram that shows the image input apparatus according to this third embodiment of the present invention, in which the same or corresponding parts or elements as those as described above (see FIG. 9) are identified by the same symbols while omitting a detailed explanation thereof. FIG. 13 is a side elevation illustrating the state in which the image input apparatus, designated at 21 in FIG. 12, is mounted on the vehicle designated at 20. FIG. 14 is an explanatory view illustrating one example of an image acquired when taking a picture of a road situation around the vehicle 20 by using the image input apparatus 21.

Figure 15:
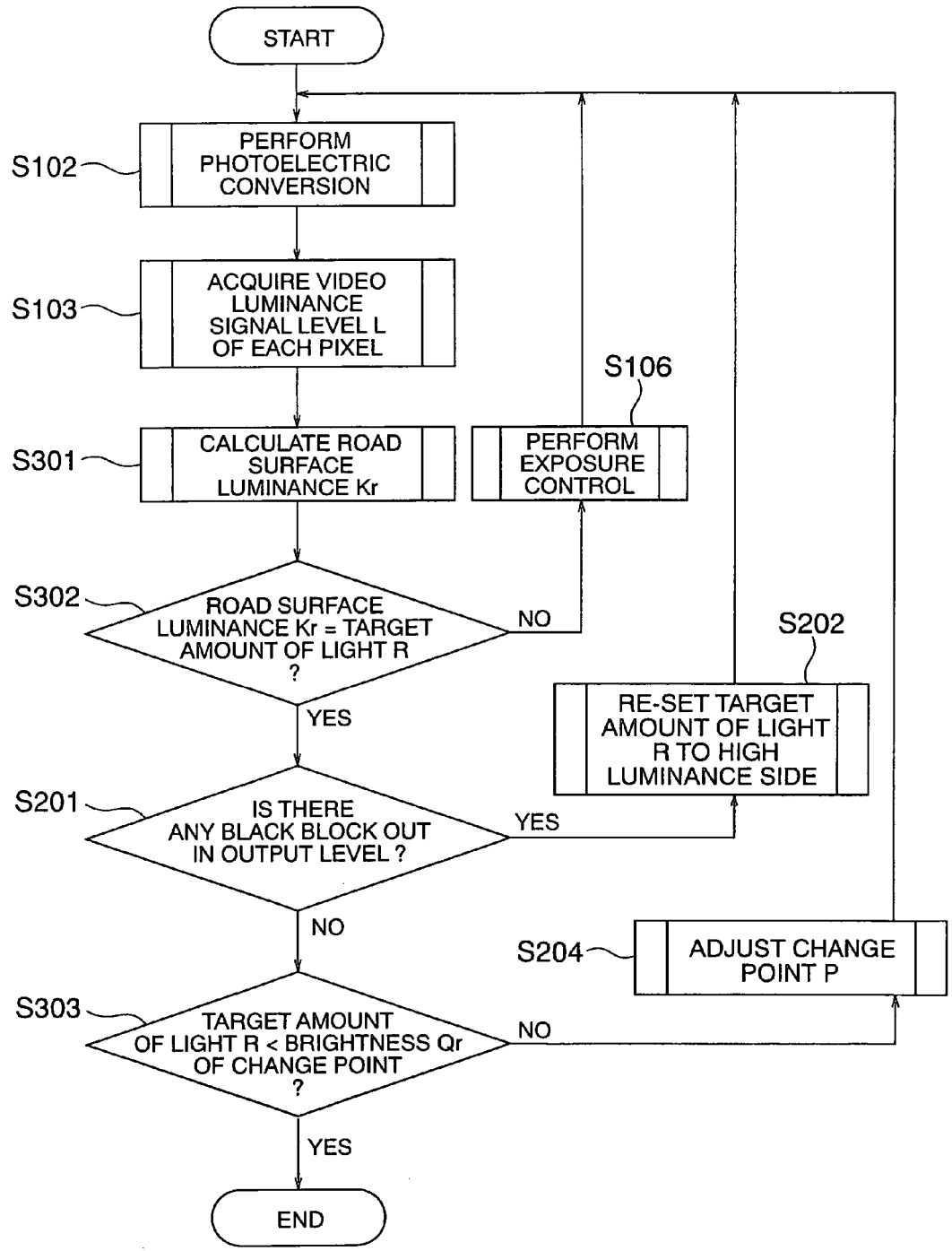
FIG. 15 is a flow chart illustrating the operation of the image input apparatus according to the third embodiment of the present invention.
Figure 16:
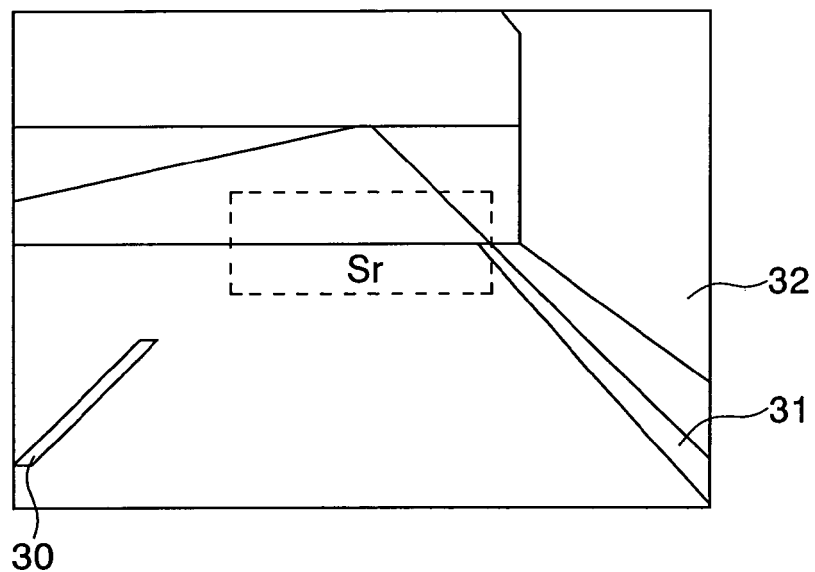
FIG. 16 is an explanatory view illustrating an example of the setting of a road surface luminance detection region according to the third embodiment of the present invention.
Figure 17:
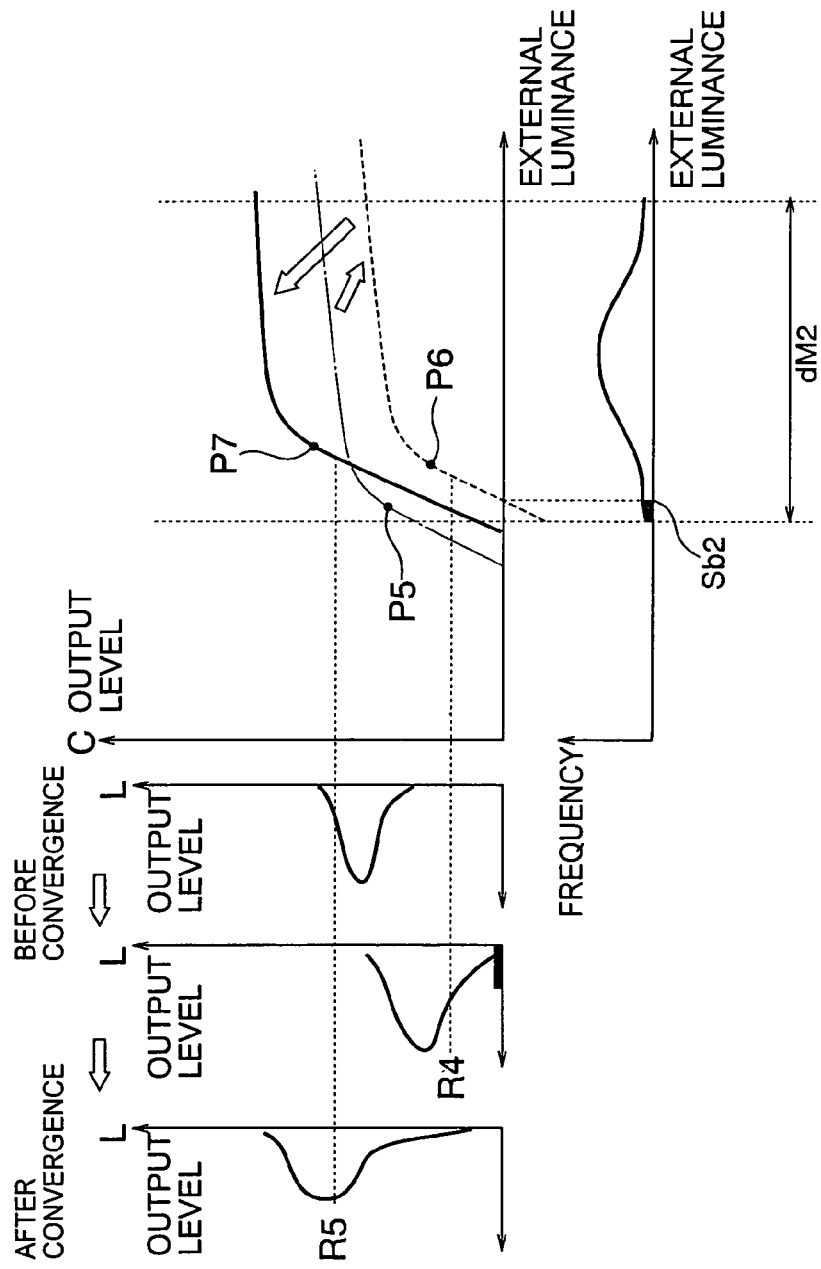
FIG. 17 is an explanatory view illustrating the change of the input-output characteristic of an image sensing device and brightness histograms of the road surface luminance detection region in accordance with the movement of a change point according to the third embodiment of the present invention.
Figure 18:
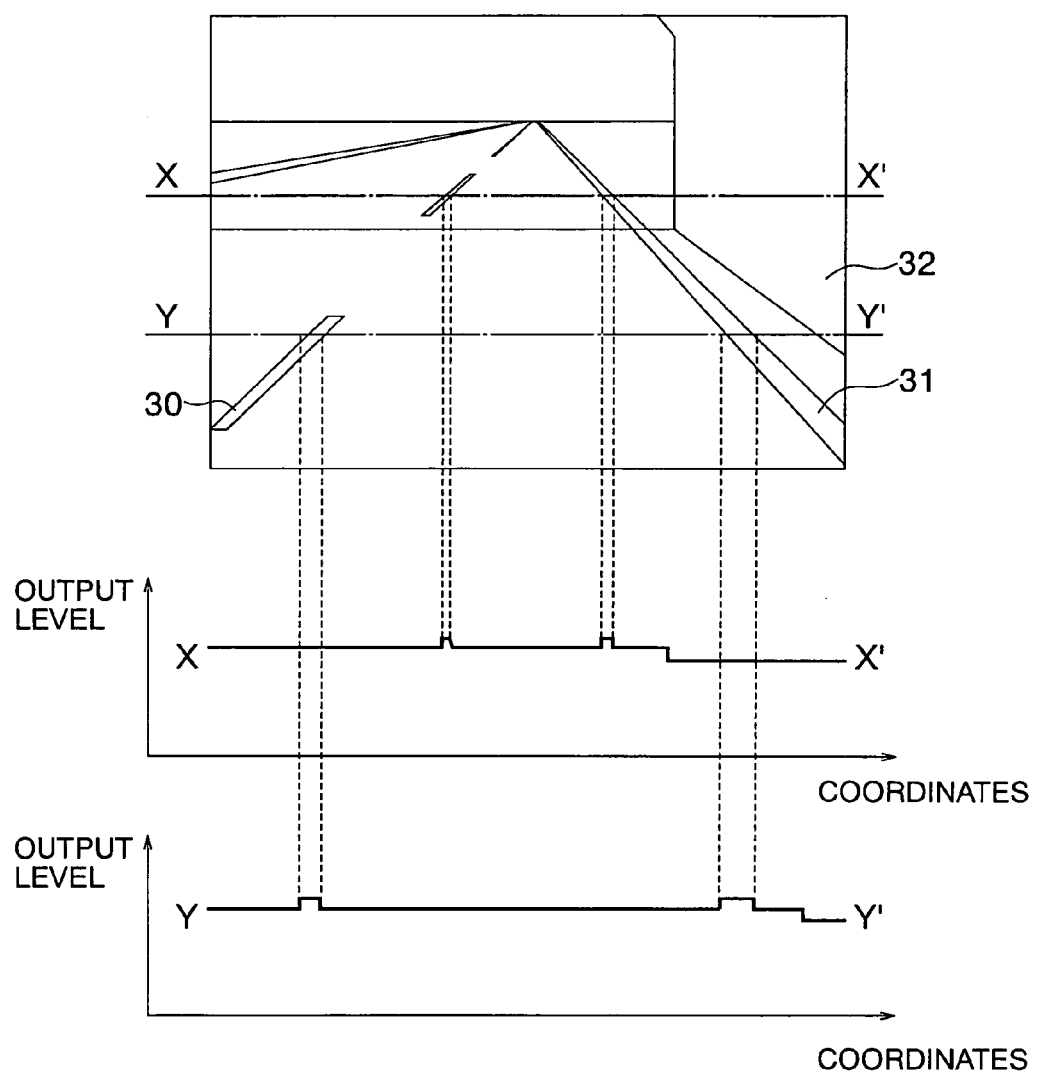
FIG. 18 is an explanatory view illustrating the intensity distribution of an image and one scanning line obtained from the input-output characteristic represented by an alternate long and two short dashes line in FIG. 17.
Figure 19:
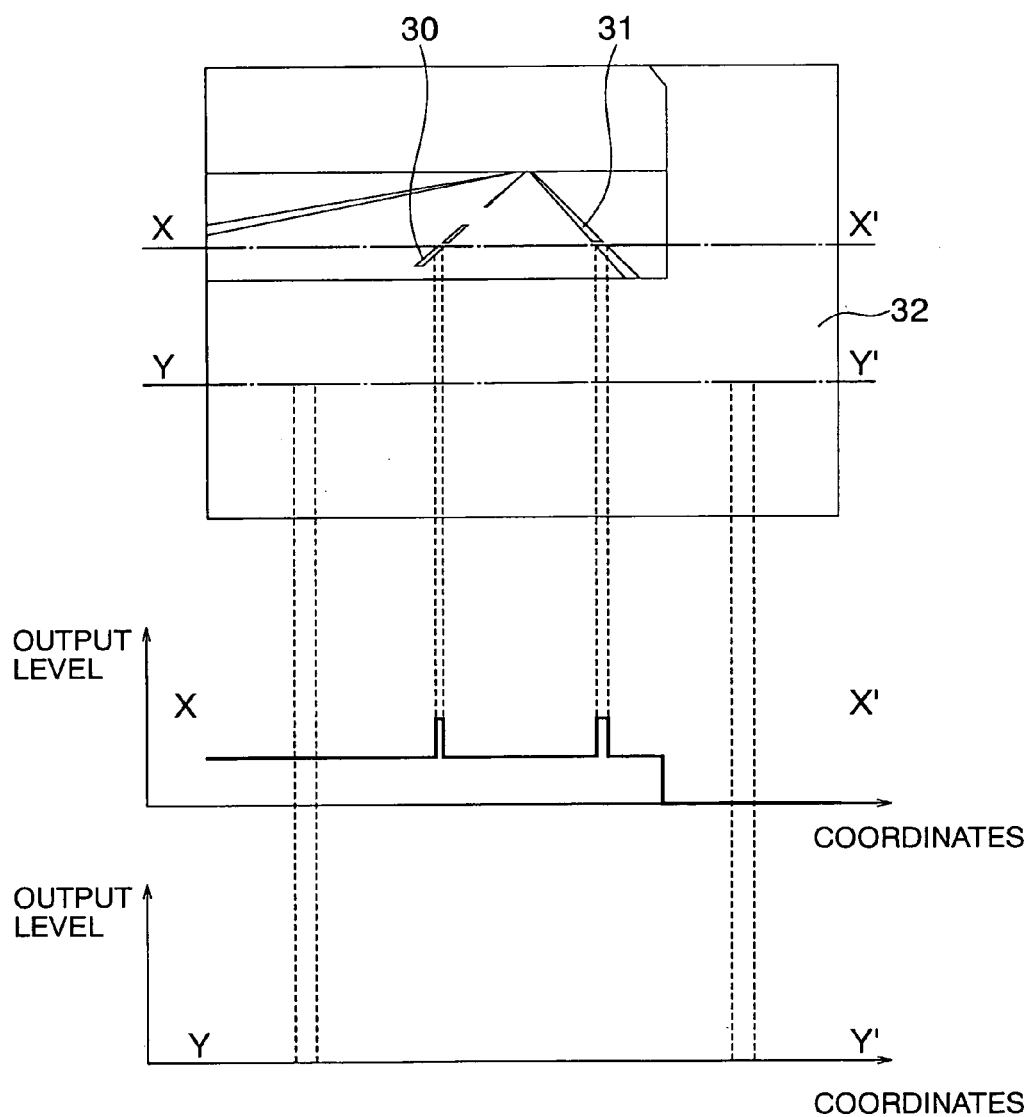
FIG. 19 is an explanatory view illustrating the intensity distribution of an image and one scanning line obtained from the input-output characteristic represented by a broken line in FIG. 17.
Figure 20:
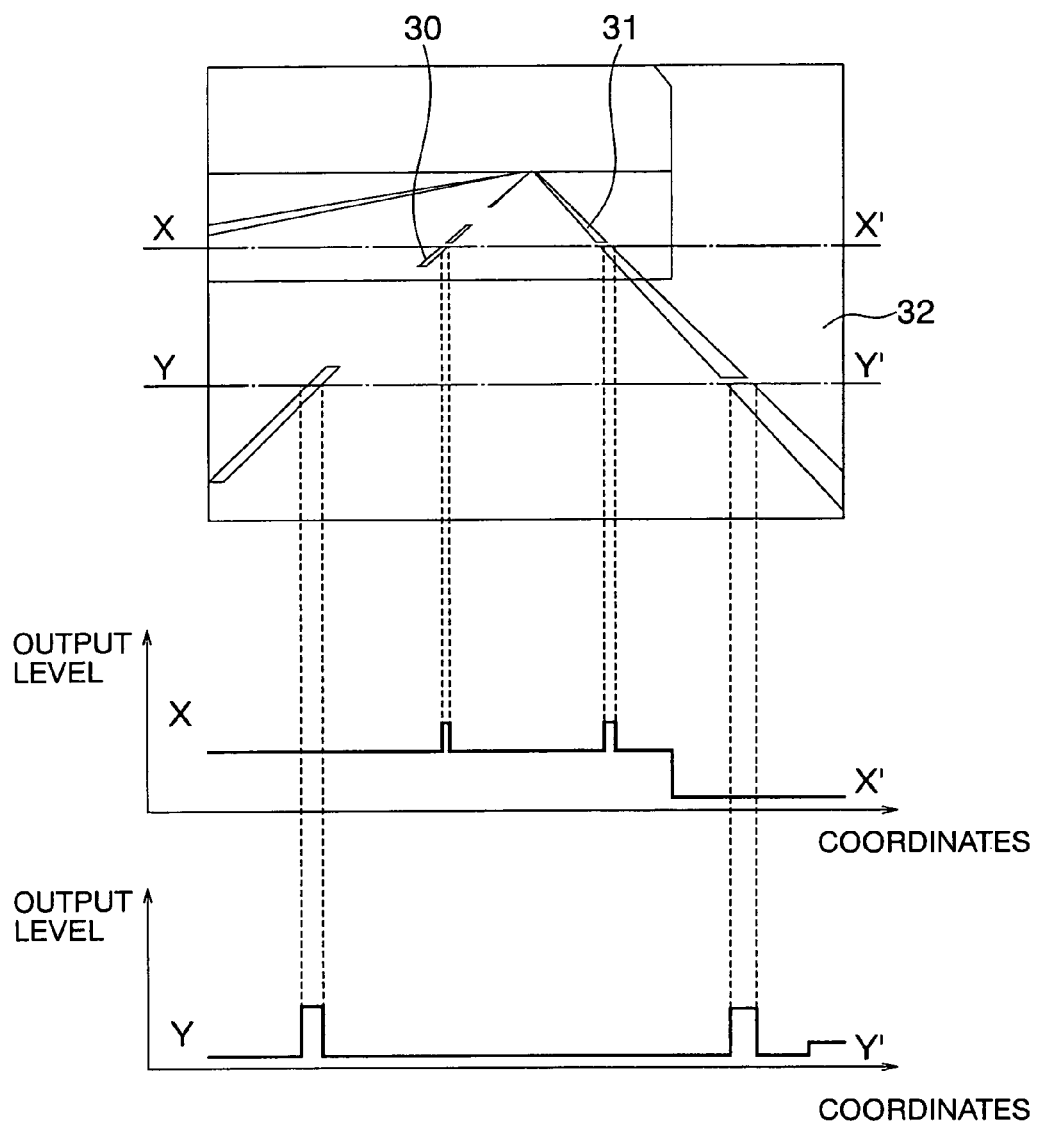
FIG. 20 is an explanatory view illustrating the intensity distribution of an image and one scanning line obtained from the input-output characteristic represented by a solid line in FIG. 17.

FIG. 15 is a flow chart that illustrates the operation of the image input apparatus 21 according to the third embodiment of the present invention. FIG. 16 is an explanatory view that illustrates a window region (road surface luminance detection area) Sr set in a manner to include a road surface therein. FIG. 17 is an explanatory view that illustrates brightness histograms of the road surface luminance detection region, the change of the input-output characteristic of the image sensing device caused by the execution of the processing routine of FIG. 15, and the according change of the video signal output level. FIG. 18 through FIG. 20 are explanatory views which illustrate examples of the output level of image data acquired from one scanning lines X-X' and Y-Y' on the screen, and which correspond to the output characteristics represented by the alternate long and short dash line, the broken line, and the solid line in FIG. 17, respectively.

In FIG. 12, a road surface luminance calculation section 16 corresponds to the above-mentioned on-screen light amount calculation section 12, and serves to calculate a road surface luminance Kr corresponding to the amount of light K on the screen and input it to the exposure control section 14. Also, in this case, the black block out information B is sent from the on-screen light amount calculation section 12 to the target light amount value setting section 13A. In FIG. 13, the image input apparatus 21 is arranged on an upper portion of the front windshield of the vehicle 20 so as to take a forward view (the direction of traveling). However, note that the present invention does not limit the direction or position of mounting of the image input apparatus 21 to the forward direction or position of the vehicle. In FIG. 14, the image input apparatus 21 of the vehicle 20 traveling, for instance, in the vicinity of an outlet of a tunnel takes a picture of a tunnel inner wall 32 together with together with a left lane marking 30 and a right lane marking 31 on a forward road surface.

Next, reference will be made to a procedure according to the third embodiment of the present invention in accordance with the flow chart of FIG. 15 while referring to FIG. 12 through FIG. 14 and FIG. 16 through FIG. 20. In FIG. 15, the same or like processes or steps as those described above (see FIGS. 2 and 10) are identified by the same symbols while omitting a detailed description thereof. Also, steps S301 through S303 correspond to the above-mentioned steps S104, S105 and S203 (FIG. 10), respectively.

First of all, in step S102, the vehicle-mounted image input apparatus 21 (see FIG. 13) converts and outputs the light incident from a road environment forward of the vehicle 20 into a video signal C through the input-output characteristic of the image sensing device 10A (see FIG. 3). Subsequently, in step S103, the video signal C representative of the vehicle surroundings output from the image sensing device 10A is converted into a corresponding image luminance signal level L by means of the incident light amount level detection section 11. As a specific processing method of converting the video signal C into the image luminance signal level L, there is considered a method of converting the video signal C into the image luminance signal level L of eight bits (256 levels of gray) by using an A/D converter as the incident light amount level detection section 11, similarly as stated above.

Thus, after the video luminance signal level L is acquired, the road surface luminance calculation section 16 calculates a road surface luminance Kr corresponding to the above-mentioned amount of light K on the screen from the video luminance signal level of each pixel in the window region Sr (step S301). As a specific method of obtaining the road surface luminance Kr in step S301, there is considered a method in which a road surface position on the imaging or picture-taking screen is marked beforehand from the image (e.g., see FIG. 14) which takes a picture of the condition of the road around the vehicle 20 by the image input apparatus 21, and an average value of a void luminance signal level Lr in the window region Sr, which is set so as to include the road surface, as shown in FIG. 16 for example, is calculated to provide the road surface luminance Kr.

Then, the exposure control section 14 makes a comparison between the road surface luminance Kr and the target amount of light R thereby to determine whether both of them coincide with each other (step S302), and if determined as Kr≠R (that is, NO), the control flow advances to exposure control processing (step S106) similar to the above-mentioned one.

As a result, when the target amount of light is set to R4 (see the dotted line) in FIG. 17 with respect to the input-output characteristic of the image sensing device 10A indicated for example by the alternate long and short dash line (change point P5) in FIG. 17, the input-output characteristic of the image sensing device 10A converges to a characteristic indicated by the broken line (change point P6) in FIG. 17.

On the other hand, if determined as Kr=R in step S302 (that is, YES), it is subsequently determined on the basis of the black block out information B whether a "black block out" phenomenon has occurred in the output level (step S201). If it is determined in step S201 that there is a "black block out" phenomenon (that is, YES), the processing of re-setting the target amount of light R to a high luminance side is carried out (step S202), and a return is performed to step S102 in FIG. 15. For instance, an image acquired for a subject Zr comprising a white line on the road (see FIG. 12) becomes like one as shown in FIG. 19 in the input-output characteristic of the image sensing device 10A after the exposure adjustment of the exposure control section 14 as indicated by the broken line in FIG. 17. That is, the white line inside the tunnel existing in a low luminance region Sb2 of the subject (see FIG. 17 becomes "black block out", and no contrast is obtained for the white line inside the tunnel. In order to avoid such "black block out", the target amount of light R4 is changed to be set to the new target amount of light R5 (see the dotted line in FIG. 17). On the other hand, if determined in step S201 that there exists no "black block out" (that is, NO), the target amount of light R (=road surface luminance Kr) is compared with the brightness Qr at a change point that is at the lowest light level thereby to determine whether the above-mentioned requirement (R<Qr) is satisfied (step S303).

If it is determined as R<Qr in step S303 (that is, YES), the processing routine of FIG. 15 is terminated at once, whereas if it is determined as R≧Qr (that is, NO), the processing of adjusting the change point P is carried out by the region change point setting section 15 (e.g., break point voltage regulation circuit) (step S204), and a return is performed to step S102 in FIG. 15. In step S204, the region change point setting section 15 adjusts the region change point P so that the relation between the target amount of light R and the brightness Qr at the change point satisfies the above-mentioned requirement (R<Qr).

That is, when the input-output characteristic of the image sensing device 10A after the exposure adjustment of the exposure control section 14 exhibits "R5>the brightness Q5 of the change point P5" and hence does not satisfy the above-mentioned requirement (R<Qr), the region change point P is adjusted by the region change point setting section 15 so as to satisfy the above-mentioned requirement.

That is, by adjusting the region change point from P6 to P7 in FIG. 17 for example, the input-output characteristic of the image sensing device 10A converges as indicated by the solid line. The output level at this time does not generate any "black block out", and satisfies the requirement "R<Qr" of the step S303.

The image acquired by using the input-output characteristic indicated by the solid line in FIG. 17 becomes like one as shown in FIG. 20, which has a high contrast between the white line and the road surface in the interior and the exterior of the tunnel.

Thus, according to the third embodiment of the present invention, it is possible to take a picture with a high contrast between the road surface and the white line without saturating the output level of the vehicle-mounted image input apparatus 21 (see FIG. 13), for example, in the "vicinity of a tunnel exit" where a light and dark difference DM is large and the external luminance is high, as shown in FIG. 16 and FIG. 17. As a result, it is possible to obtain an image effective for white line recognition processing.

Figure 21:
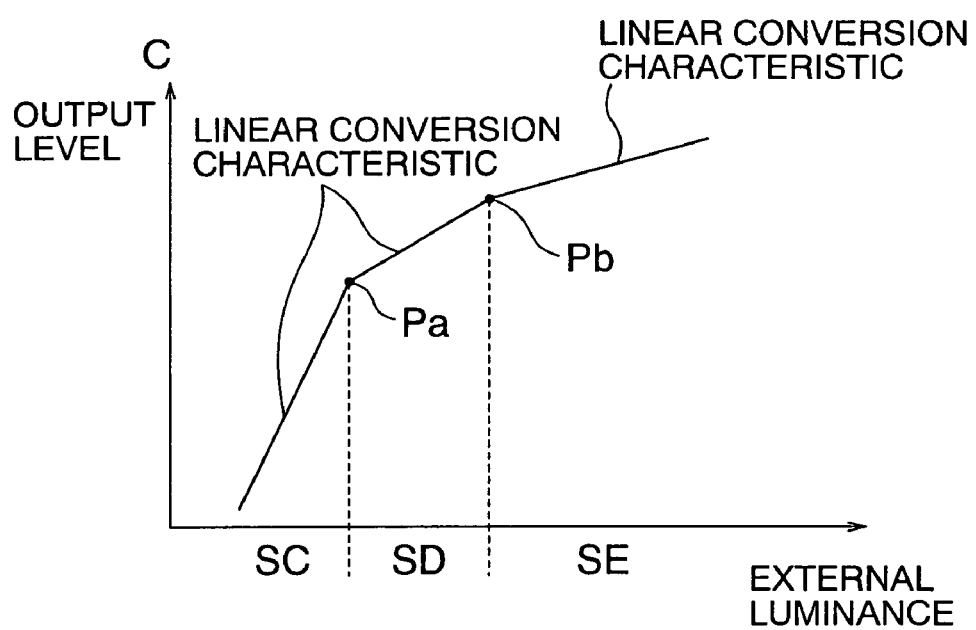
FIG. 21 is an explanatory view illustrating another example of the input-output characteristic of the image sensing devices according to first through third embodiments of the present invention.

Although in the above-mentioned respective first through third embodiments, for the image sensing devices 10, 10A, there is used one with a linear characteristic and a logarithmic compression characteristic as its input-output characteristic (see FIG. 3), the input-output characteristic of each of the image sensing devices 10, 10A is not limited to that shown in FIG. 3. For example, another input-output characteristic may be employed in which a plurality of linear characteristics having different slopes, respectively, with change points Pa, Pb being used as boundaries as shown in FIG. 21, can be combined with one another to achieve a wide dynamic range. In this case, the slopes are set larger in the lower luminance side region, and smaller in the higher luminance side region.

While the invention has been described in terms of preferred embodiments, those skilled in the art will recognize that the invention can be practiced with modifications within the spirit and scope of the appended claims.

What is claimed is:

1. An image input apparatus comprising:
    an image sensing device with an input-output characteristic varying with a plurality of regions delimited in accordance with a difference in the amount of incident light;
    an incident light amount level detection section that outputs a video luminance signal level of a video signal representative of a picture taken by said image sensing device;
    an on-screen light amount calculation section that calculates an amount of light on a screen of said video signal from said video luminance signal level;
    a target light amount value setting section that selectively sets a target value R for said amount of light on the screen based on information on change points for said plurality of regions; and
    an exposure control section that adjusts an exposure time or output gain of said image sensing device so as to make said amount of light on the screen coincide with said target amount of light R;
    wherein said target light amount value setting section sets said target amount of light R in such a manner that a relation between an amount of light Q at that one of said change points for said plurality of regions that is at the lowest luminance and said target amount of light R satisfies the following requirement;
    R<Q, when it is determined that R is greater than or equal to Q.

2. The image input apparatus as set forth in claim 1, further comprising a region change point setting section that sets said change points for said plurality of regions;
    wherein said region change point setting section changes the setting of a change point that is at the lowest luminance so as to satisfy said requirement when a relation between an amount of light at said change point of the lowest luminance and said target amount of light does not satisfy said requirement after the exposure adjustment of said exposure control section.

3. The image input apparatus as set forth in claim 1, wherein said image sensing device is mounted on a vehicle; and
    said on-screen light amount calculation section calculates a luminance of a road surface around said vehicle imaged by said image sensing device as said amount of light on the screen.

4. The image input apparatus as set forth in claim 1, wherein
    said image sensing device applies a linear conversion characteristic to a lower luminance side region and a logarithmic conversion characteristic to a higher luminance side region.

5. The image input apparatus as set forth in claim 1, wherein
    said image sensing device sets a linear conversion characteristic in such a manner that the slope of the linear conversion characteristic for a lower luminance side one of said plurality of regions is set larger than the slope of the linear conversion characteristic for a higher luminance side one of said plurality of regions.

* * * * *